United States Patent
Inukai et al.

(10) Patent No.: US 6,674,212 B2
(45) Date of Patent: Jan. 6, 2004

(54) CURRENT-CARRYING MEMBER FOR A DIRECT-CURRENT MOTOR IN A FUEL PUMP, METHOD FOR PRODUCING THE SAME, AND FUEL PUMP

(75) Inventors: Kyoji Inukai, Toyota (JP); Youichi Murakami, Ama-gun (JP); Etsuo Kokuryu, Chita-gun (JP); Kenzo Kiyose, Takahama (JP); Keizo Takeuchi, Handa (JP); Tokio Hotta, Matsusaka (JP); Yoichi Sakaura, Matsusaka (JP); Kenichi Matsumoto, Matsusaka (JP); Sinya Nakagawa, Matsusaka (JP); Makoto Nisio, Matsusaka (JP)

(73) Assignees: Denso Corporation, Kariya (JP); TRIS Inc., Matsusaka (JP)

( * ) Notice: Subject to any disclaimer, the term of this patent is extended or adjusted under 35 U.S.C. 154(b) by 26 days.

(21) Appl. No.: 10/162,205

(22) Filed: Jun. 5, 2002

(65) Prior Publication Data
US 2002/0180300 A1 Dec. 5, 2002

(30) Foreign Application Priority Data
Jun. 5, 2001 (JP) ............................................... 2001-169673

(51) Int. Cl.[7] ................................................. H01R 39/52
(52) U.S. Cl. ........................ 310/223; 310/44; 310/219; 310/237
(58) Field of Search ................................ 310/233, 237, 310/235, 42, 44, 251, 219

(56) References Cited

U.S. PATENT DOCUMENTS

| | | | | |
|---|---|---|---|---|
| 4,019,076 A | * | 4/1977 | Bates | 310/233 |
| 5,629,576 A | * | 5/1997 | Shimoyama | 310/237 |
| 5,637,944 A | * | 6/1997 | Shimoyama | 310/237 |
| 5,679,996 A | * | 10/1997 | Strobl | 310/237 |
| 5,793,140 A | * | 8/1998 | Tuckey | 310/237 |
| 6,222,298 B1 | | 4/2001 | Saito et al. | |
| 6,242,838 B1 | * | 6/2001 | Kiyose et al. | 310/233 |

FOREIGN PATENT DOCUMENTS

| | | |
|---|---|---|
| JP | 8-308183 | 11/1996 |
| JP | 9-46978 | 2/1997 |

* cited by examiner

Primary Examiner—Thanh Lam
(74) Attorney, Agent, or Firm—Nixon & Vanderhye P.C.

(57) ABSTRACT

A sulfidation-resistant current-carrying member, such as a commutator, suitable for a direct-current motor in a fuel pump is provided. The current-carrying member for a direct-current motor in a fuel pump includes a commutator composed of a carbon layer having carbon as a principal component and forming a sliding surface at one end, and a metal carbon layer fixedly bound with the carbon layer at the other end and comprising 55 to 90 wt % of metal having brass as a principal component and a remaining portion having carbon as a principal component. By using brass as a primary metal component in the metal carbon layer, it is possible to achieve a commutator with superior resistance to sulfidation.

5 Claims, 5 Drawing Sheets

CURRENT-CARRYING MEMBER FOR A DIRECT-CURRENT MOTOR IN A FUEL PUMP, METHOD FOR PRODUCING THE SAME, AND FUEL PUMP

CROSS REFERENCE TO RELATED APPLICATION

This application is based upon, and claims the benefit of priority of, prior Japanese Patent Application 2001-169673, filed on Jun. 5, 2001, the contents of which are incorporated herein by reference.

BACKGROUND OF THE INVENTION

1. Field of the Invention

The present invention relates to a multi-layer current-carrying member (a brush portion or a commutator portion) for a direct-current motor in a fuel pump, a method for producing the member, and a fuel pump employing the member.

2. Description of Related Art

Engines in automobiles, and the like, are normally equipped with low pressure fuel pumps for pumping fuel from a fuel tank to a delivery pipe or to a high pressure pump of a fuel injection valve or device. Such a fuel pump is generally driven by a direct-current (DC) motor using a battery or other power supply source. In the case of the DC motor, it is necessary to keep a direction of a current constant with a rotational position of an armature coil, and for this reason, rectification is carried out by a brush and a commutator.

Additionally, resistance to fuel erosion (resistance to a fuel that causes erosion) is required for a fuel pump, whether it is an in-tank type or other type, and, in particular, for its DC motor. Japanese Laid-Open Patent Publication No. Hei. 8-308183 discloses a commutator (carbon commutator segments) containing a carbon layer in a sliding portion for a brush. Further, the publication describes that by forming a metal carbon layer beneath the carbon layer, the bonding to a conductive metal terminal (riser) can be ensured. The conductive metal terminal is connected to the metal carbon layer at one end thereof, and to the armature coil at the other end. Similar descriptions are disclosed in Japanese Laid-Open Patent Publication No. Hei. 9-46978 and International Publication No. WO99/08367.

The metal carbon layers disclosed in Japanese Laid-Open Patent Publication Nos. Hei. 8-308183 and Hei. 9-46978 are formed by sintering a copper powder with a carbon powder. Also, the metal carbon layer disclosed in the International Publication No. WO99/08367 is formed by sintering a mixed powder of a copper powder, a tin powder, and a carbon powder. International Publication No. WO99/08367 describes bonding between the carbon layer and the conductive metal terminal as being improved due to a liquid phase of the tin powder having a low melting point. A composition ratio of copper to tin in this publication is about Cu-10 Sn (wt %).

The inventor of the present invention, however, has found that a current-carrying member, such as a commutator and a brush, using copper or copper alloy with a high content of copper has poor resistance to a fuel. To be more specific, the current-carrying member has poor resistance to erosion because of sulfur in the fuel. Erosion of the current-carrying member is not acceptable because it deteriorates the durability and performance of the fuel pump. Hence, the current-carrying member is required to have satisfactory resistance to sulfidation.

SUMMARY OF THE INVENTION

The present invention was devised in view of the foregoing disadvantages. Therefore, it is an object of the present invention to provide a sulfidation-resistant current-carrying member for a DC motor in a fuel pump. It is another object of the present invention to provide a method for producing such a fuel pump. The present invention has yet another object which is to provide a fuel pump employing the current-carrying member.

(Current-carrying Member for a DC Motor in a Fuel Pump)

In order to achieve the above and other objects, sulfidation-resistant brass is used as the metal in the metal carbon layer of a current-carrying member composed of a carbon layer and a metal carbon layer. That is, a current-carrying member for a DC motor in a fuel pump of the present invention comprises a brush having a sliding surface at one end and fed with a current from a power supply source. Additionally, the member has a commutator with a sliding surface that slides on a sliding surface of the brush for feeding an armature coil with the current received from the brush. At least one of the brush and the commutator is composed of a carbon layer having carbon as a principal component and forming the sliding surface at one end, and a metal carbon layer fixedly bound with the carbon layer at the other end and comprising 55 to 90 wt % of metal having brass as a principal component and a remaining portion having carbon as a principal component.

According to the current-carrying member of the present invention, because metal in the metal carbon layer has brass as a principal component, resistance to sulfidation is enhanced, making it possible to enhance durability of the current-carrying member, and hence, that of the fuel pump. The reason why a weight ratio of the metal in the metal carbon layer (out of a total of 100 wt %) is set to a range from 55 to 90 wt % is as follows. A weight ratio less than 55 wt % is not preferable because a specific resistance value of the metal carbon layer increases.

Generally, a conductive metal terminal is connected to the metal carbon layer, and the armature coil is fed with a current through the conductive metal terminal. For this reason, it is preferable that the metal carbon layer has a small resistance value. Also, a weight ratio of the metal less than 55 wt % is not preferable, because the metal carbon layer has poor strength, which deteriorates the retentivity of the current-carrying member. In particular, in a case where the conductive metal terminal is connected to the metal carbon layer mechanically (for example, in the case of press-fitting or fastening), the metal carbon layer needs to have the strength of a certain or greater degree in order to secure a stable connection therebetween.

Likewise, a weight ratio of the metal higher than 90 wt % is also not preferable because the bonding strength in the vicinity of the boundary of the carbon layer and the metal carbon layer becomes poor. When the bonding strength becomes poor, an overall resistance value increases, which deteriorates the retentivity of the current-carrying member. Further, when a weight ratio of the metal exceeds 90 wt %, the metal carbon layer becomes too rigid and hard. Hence, for example, in a case where the conductive metal terminal is connected to the metal carbon layer by press-fit or the like, the machining load required to achieve the press-fit, or the like, increases. Then, the load reaches the carbon layer, having a relatively poor toughness, which may possibly cause cracking or the like in the carbon layer.

In view of the foregoing, it is preferable to set a weight ratio of the metal to a range from 55 to 90 wt % and more preferably to a range from 70 to 80 wt %. The current-carrying member of the present invention includes a type in which the conductive metal terminal is embedded into the metal carbon layer and the metal carbon layer and the conductive metal terminal are integrally sintered.

The metal carbon layer is composed of, for example, a porous metal skeleton having brass as a principal component, and a filling material present in the porous metal skeleton having carbon as a principal component. The metal carbon layer may be integrally formed by sintering a mixture of a brass powder, a carbon powder, etc. or formed by filling foamed metal (porous metal skeleton) prepared in advance to have brass as a principal component with a filling material having carbon as a principal component.

Brass used in the metal carbon layer is an alloy having Cu and Zn as principal components. For example, a copper alloy containing 25 to 45 wt % of Zn on a basis of 100 wt % of brass is favorable as brass. Zn has a larger sulfide-producing free energy than Cu, and is an effective sulfidation-resistant element. When a weight ratio of Zn is less than 25 wt %, resistance to sulfidation of the metal carbon layer becomes insufficient. A weight ratio of Zn higher than 45 wt % is not preferable, because of the β phase precipitates, which deteriorate the workability of the metal carbon layer.

When Zn is added up to 45 wt %, the strength is enhanced with the addition of Zn, and when Zn is added up to 40 wt %, the elongation is enhanced in comparison with a case using a pure metal powder, which provides advantages in connecting the conductive metal terminal to the metal carbon layer by press-fitting or the like. Hence, a weight ratio of Zn is preferably in a range from 25 to 45 wt % and more preferably in a range from 30 to 40 wt %. Therefore, the carbon layer is sulfidation-resistant.

In the present specification, the term "current-carrying member" includes, but is not limited to, commutator segments and a unit of a brush, and can be broadly interpreted as the commutator segments and the brushes plus peripheral members, such as the conductive metal terminals (risers, pig tails, etc.), connected thereto. In short, the current-carrying member means a unit member or a device necessary to feed the armature with a current.

The aforementioned "metal" has brass as a principal component, but it may be brass itself, or include an alloy element, such as Sn, in addition to brass. "Carbon" is a carbonaceous material having a sliding property and conductivity, and is primarily graphite. It should be appreciated, however, that the carbon layer is not limited to a layer made of 100% of carbon, and may include a binder or other kinds of treatment agent. It is needless to say that "metal", "carbon", "carbon layer", and "metal carbon layer" may include unavoidable impurities.

(Method for Producing a Current-carrying Member)

(1) A Producing Method of the Current-carrying Member

The above-described current-carrying member is produced by a producing method of the present invention as follows. That is, a method for producing a current-carrying member for a DC motor in a fuel pump of the present invention is a method for producing a current-carrying member including a brush having a sliding surface at one end and fed with a current from a power supply source. Additionally, a commutator is provided with a sliding surface that slides on the brush sliding surface for feeding an armature coil with the current received from the brush, with at least one of the brush and the commutator being composed of a carbon layer forming the sliding surface at one end, and a metal carbon layer fixedly bound with the carbon layer at the other end. The method entails a filling step of filling a green compact mold first with one of: (a) a carbon powder having carbon as a principal component to form the carbon layer, or (b) a mixed powder comprising 55 to 90 wt % of a metal powder having brass as a principal component mixed with a carbon powder having carbon as a principal component to form the metal carbon layer. Next is a molding step of forming a molded green compact by compacting the powders after the filling step and a sintering step of sintering the carbon layer and the metal carbon layer while they are fixedly bound with each other by heating the molded green compact.

According to the producing method of the present invention, it is possible to produce the above-described current-carrying member efficiently. The reason why the weight ratio of the metal powder is set to a range from 55 to 90 wt % on a basis of 100 wt % of the metal carbon layer is the same as given above. The carbon powder may contain a binder made of a thermo-setting resin, such as phenol resin, if required. The same can be said as to the mixed powder. The metal powder may be a brass powder or a metal mixed powder of a zinc powder mixed with a copper powder.

In the filling step, it is preferable to carry out a compacting step of compacting a carbon powder forming the carbon layer or the mixed powder forming the metal carbon layer. Both are filled during the preceding filling step. According to this step, it becomes easier to regulate the thickness of the carbon layer or the metal carbon layer. Incidentally, as to the metal powder, a water atomized powder having a strong oxide film on the surface thereof is favorable as the brass powder. The reason why is as follows. That is, although Zn readily evaporates from the metal powder during the sintering step, when the brass powder having a strong oxide film on the surface is used, a loss of Zn can be controlled and prevented by the oxide film.

Generally, according to the gas atomization method, molten metal dropped from a nozzle is blown off by a reducing gas to be divided into particles. By using water in this blowing method, a strong oxide film is formed on the surface of the brass when it is cooled from a high temperature. A copper alloy powder containing 25 to 45 wt % of Zn on a basis of 100 wt % of brass is favorable as the brass powder. The reason why is the same as given above.

Also, it is favorable that the metal powder contain a tin powder. Tin has a lower melting point than brass or the like, and the tin powder begins to melt first in the sintering step. As a result, the tin powder and the brass powder or the like undergo partial molten bonding (liquid phase sintering) at a relatively low temperature. Also, Cu melts into molten Sn, which facilitates easier dispersion of one in the other. Accordingly, a uniform metal composition is attained in the metal carbon layer, thereby making it possible to obtain a metal carbon layer in which the metal powder is firmly bound. For the same reason, the metal powder preferably contains a phosphorus compound powder instead of or in addition to the tin powder.

It is preferable to adjust the size of a green compact mold and a quantity of the filled carbon powder or metal powder by taking into account the thermal contraction or the like during sintering. Also, it is sufficient that the metal carbon layer has a uniform composition across the layer, but a functional gradient may be conferred by changing compositions of the mixed powder step by step, if required.

(2) Additional Producing Method of the Current-carrying Member

The method for producing the current-carrying member may be as follows. That is, a method for producing a current-carrying member for a DC motor in a fuel pump of the present invention is a method for producing a current-carrying member comprising a brush having a sliding surface at one end and fed with a current from a power supply source. Additionally, a commutator having a sliding surface that slides on the sliding surface of the brush for feeding an armature coil with the current received from the brush is present while at least one of the brush and the commutator are composed of a carbon layer and form the sliding surface at one end. A metal carbon layer is fixedly bound with the carbon layer at the other end. The method comprises: a metal carbon molding step of forming a molded metal carbon green compact by filling cavities in 55 to 90 wt % of foamed metal having brass as a principal component to form the metal carbon layer with a filling material having carbon as a principal component; a carbon molding step of forming a molded carbon green compact by filling a green compact mold with a carbon powder having carbon as a principal component to form the carbon layer, followed by compacting; and a sintering step of sintering the metal carbon layer with the carbon layer fixedly with the layers bound to each other by depositing the molded metal carbon green compact and the molded carbon green compact.

A weight ratio of 55 to 90 wt % given to the foamed metal is based on 100 wt % of the molded metal carbon green compact. Because the porous metal skeleton is already formed, the metal mixed powder need not be adjusted, which makes it easier to control the temperature during the sintering step. The foamed metal is filled with the filling material by, for example, dipping the foamed metal in a liquid treatment prepared by dissolving carbon into a solvent, or by applying a spray of the liquid treatment onto the foamed metal followed by drying.

A plurality of thin sheets of foamed metal filled with carbon may be prepared so that the metal carbon layer of a desired thickness is obtained by depositing and pressing these thin sheets. It is efficient to place the molded metal carbon green compact in the green compact mold to form the molded carbon green compact integrally with the molded metal carbon green compact in the carbon molding step, so that the step of depositing the molded metal carbon green compact and the molded carbon green compact can be omitted.

The descriptions as to a weight ratio of the foamed metal, the carbon powder, brass, etc. also apply in this case.

(Fuel pump)

The above-described current-carrying member can be applied to a DC motor regardless of the type of fuel pump that the motor drives. By employing this current-carrying member, it is possible to enhance the durability of the fuel pump. Hence, the present invention can be interpreted as a fuel pump employing the above-described current-carrying member.

That is, a fuel pump of the present invention is a fuel pump employing a current-carrying member for a DC motor, the current-carrying member including: a brush having a sliding surface at one end and fed with a current from a power supply source; and a commutator having a sliding surface that slides on the sliding surface of the brush for feeding an armature coil with the current received from the brush. Furthermore, at least one of the brush and the commutator is composed of a carbon layer having carbon as a principal component and forming the sliding surface at one end, and a metal carbon layer fixedly bound with the carbon layer at the other end and comprising 55 to 90 wt % of metal having brass as a principal component and a remaining portion having carbon as a principal component.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
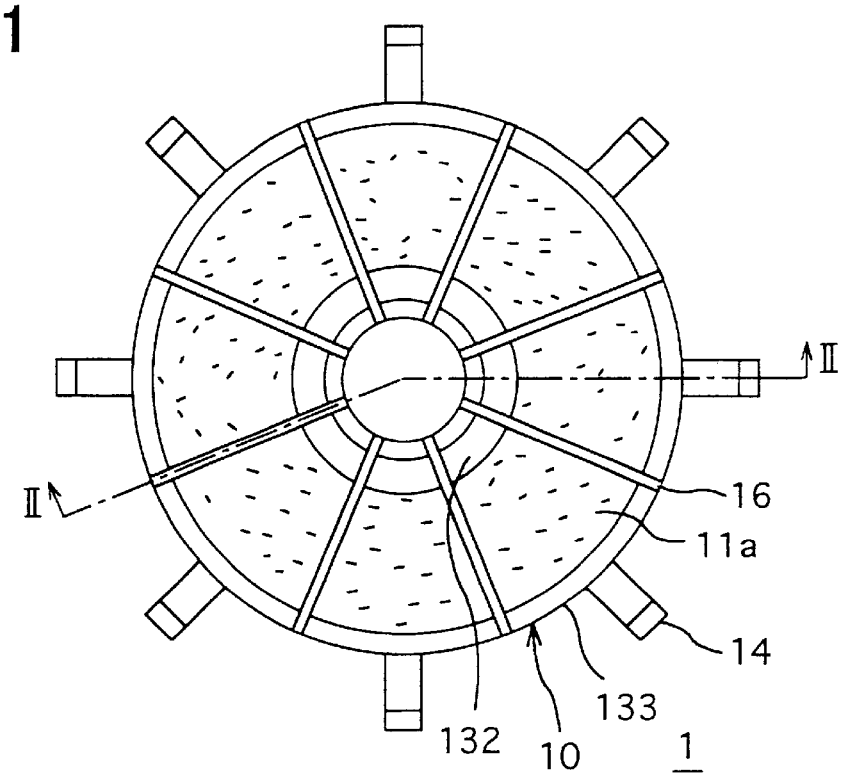
FIG. 1 is a plan view showing a commutator according to a first embodiment of the present invention.
Figure 2:
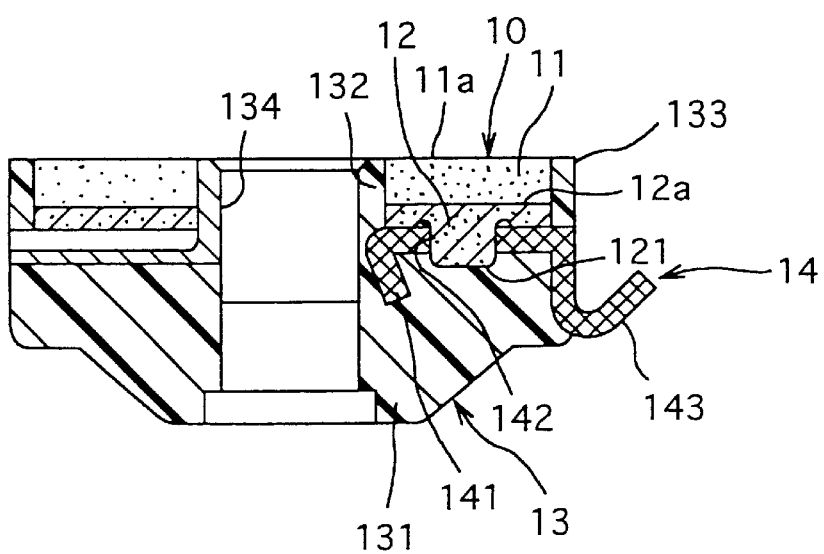
FIG. 2 is a cross-sectional view taken along line II—II of FIG. 1.

FIGS. 1 shows a commutator 1 as a current-carrying member for a direct-current motor in a fuel pump. FIG. 2 is a cross-sectional view taken along the line II—II of FIG. 1. As can be understood from FIGS. 1 and 2, the commutator 1 is flattened, and comprises eight nearly fan-shaped commutator segments 10, conductive metal terminals 14, which are attached to the respective commutator segments 10, at a bottom surface of the commutator segments (in the drawing), and a supporter 13 for integrally holding the radially aligned commutator segments 10 and their respective conductive metal terminals 14.

Each commutator segment 10 comprises a carbon layer 11 having a sliding surface 11a on the top surface, and a metal carbon layer 12 bound with the carbon layer 11 at a boundary 12a. A column-shaped projection 121 projects from the bottom surface of the metal carbon layer 12. The sliding surface 11a slides on a sliding surface of a brush (not shown).

Each conductive metal terminal 14 comprises a stopping claw 141 bent and embedded into a boss member 131 of the supporter 13, a ring 142 press-fitted into the projection 121 of the metal carbon layer 12, and a hook 143 press-adhered to a copper wire extending from one end of an armature coil with heating by means of fusing. By taking the resistance to sulfidation into account, the conductive metal terminals 14 are made of brass (copper alloy containing 30 wt % of Zn).

The supporter 13 has an axis hole 134 at its center, into which the axis of the armature (not shown) fits, a boss member 131, and an inside wall 132 built at the center and an outside wall 133 built at the periphery of the boss member 131. The commutator segments 10 and the conductive metal terminal 14 are held in a concave portion defined by the boss member 131, the inside wall 132, and the outside wall 133.

The commutator 1 is produced as follows. First, a set of conductive metal terminals 14 integrally formed in an annular-shape is attached to a set of commutator segments 10 also integrally formed in an annular-shape. This attachment is carried out by press-fitting the projections 121 into the rings 142, respectively. As a result, the commutator segments 10 and the conductive metal terminals 14 are integrally bound to form an annular-shaped, coupled body. The resulting coupled body is placed into a mold and the coupled body is surrounded entirely with insulating resin by means of resin molding in such a manner that only the sliding surfaces 11a are exposed. As a result, a disc-shaped commutator material having a cross section as shown in FIG. 2 is obtained. Herein, the axis hole 134 is formed by a core 24 pre-formed in the mold, which will be described below.

Further, slitting is applied to the commutator material to form the 8-divided commutator segments 10 as shown in FIG. 1. The slitting insulates the commutator segments 10 from each other. Additionally, the carbon layer 11, the metal carbon layer 12, the inside wall 132, and the outside wall 133 are cut while the boss member 131 is left uncut.

The commutator 1 obtained in this manner functions as follows. When a plurality of brushes (not shown) slide on the respective sliding surfaces 11a of the commutator 1, a current flows in the DC motor in the order as follows: power supply source→brushes→carbon layer 11→metal carbon layer 12→conductive metal terminal 14→armature coil (not shown). Then, the commutator 1 causes a constant force (and torque) to act on the armature coil, which allows the armature to rotate in a constant direction in driving the fuel pump. Because fuel pumps are a widely known structure, a detailed description of such is omitted.

(Example-Method for Producing Commutator Material)

The following description will describe the current-carrying member according to one embodiment of the present invention by using the above-described producing method of the commutator material as an example.

Figure 3:
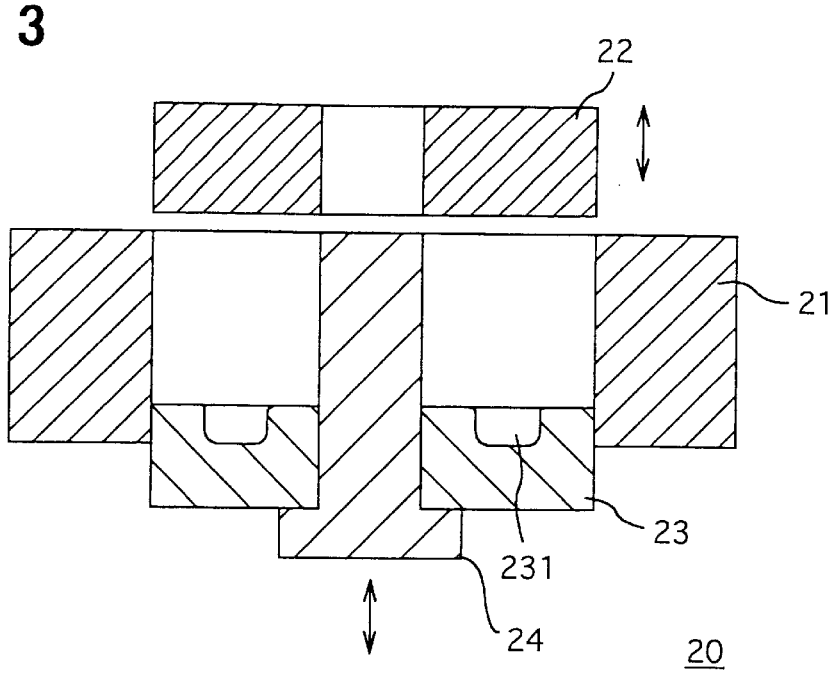
FIG. 3 is a cross-sectional view showing a green compact mold employed in an example of the present invention.

The commutator material is produced as follows. Hereinafter, the carbon layer and the metal carbon layer in the commutator material are simply referred to as such. First, a green compact mold 20 as shown FIG. 3 is prepared. The green compact mold 20 comprises a cylindrical die 21, cylindrical top punch 22 and bottom punch 23 which both fit into the inner periphery of the die 21. The column-shaped core 24 fits into the inner periphery of the top punch 22 and the bottom punch 23. On the top surface of the bottom punch 23, eight concave portions 231 having a shape of a bottomed-cylinder corresponding to the above-described projections 121 are concentrically formed.

A cavity formed by the die 21, the bottom punch 23, and the core 24 is filled with a mixed powder forming the metal carbon layer (filling step). This mixed powder is a mixture of an atomized powder of brass, a carbon powder, and a tin powder. The mixed powder is compressed by the top punch 22 and the bottom punch 23 until a layer of a desired thickness is obtained (compacting step).

Subsequently, the cavity is filled with a carbon powder comprising the same carbon powder as described above but also containing a binder on top of the above-described mixed powder (filling step). Then, the filled carbon powder is compressed by the top punch 22 and the bottom punch 23, and as a result, a molded commutator material is formed as a green compact in a desired shape (molding step). The molded commutator material green compact comprises a molded metal carbon green compact and a molded carbon green compact, which are integrally formed. The molded commutator material green compact is placed into an electric furnace and heated to sinter each molded green compact, and as a result, a commutator material in which the metal carbon layer and the carbon layer are firmly bonded with each other is obtained (sintering step).

Hereinafter, the press-fitting of a set of the conductive metal terminals 14, the resin molding, and the slitting are carried out sequentially as described above, to complete the commutator 1.

(Measurement and Evaluation)

(1) Resistance to Sulfidation

Figure 4:
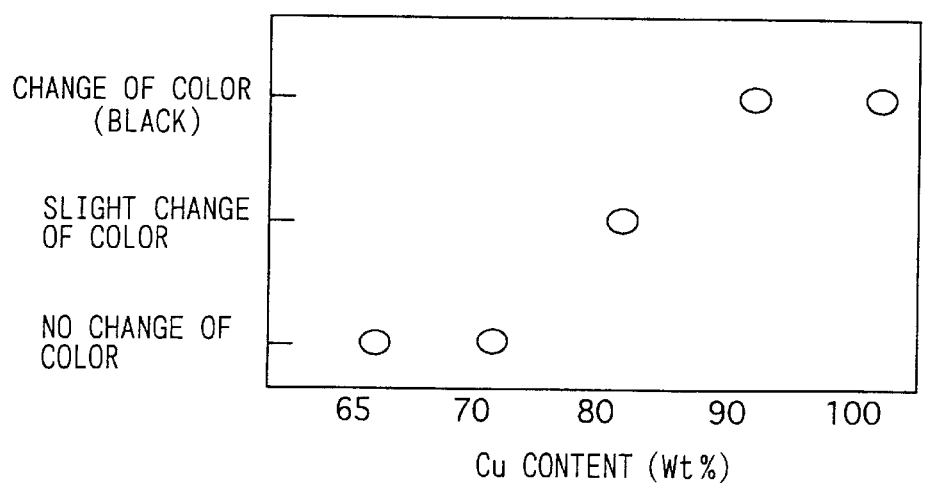
FIG. 4 is a graph showing a relationship between a weight percent content of Cu in brass and resistance to sulfidation.

First, the composition of sulfidation-resistant brass, which is suitable for the current-carrying member, was analyzed as follows. Test pieces of 10×10×20 mm made of brass each having a different percentage content by weight of Cu were dipped in regular gasoline added with 0.2 wt % of a sulfur powder. The regular gasoline was maintained at 60° C. and a change of color in each test piece after 100 hours was observed. The result is set forth in FIG. 4.

A color of the test pieces started to change (turning to black) when the weight percentage of Cu was 80 wt % or more. Hence, it is understood that in order to confer resistance to sulfidation, a weight percentage of Cu is preferably less than 80 wt %, and more preferably less than 75 wt %. In other words, it is understood that a percentage content by weight of Zn is preferably 25 wt % or more.

(2) Influence of Quantity of Zinc on Strength and Elongation

Figure 5:
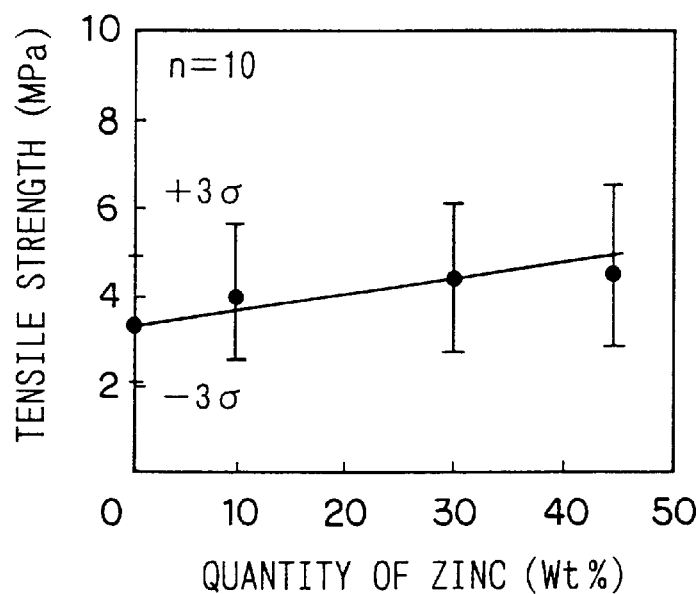
FIG. 5 is a graph showing a relationship between a quantity of zinc and tensile strength.
Figure 6:
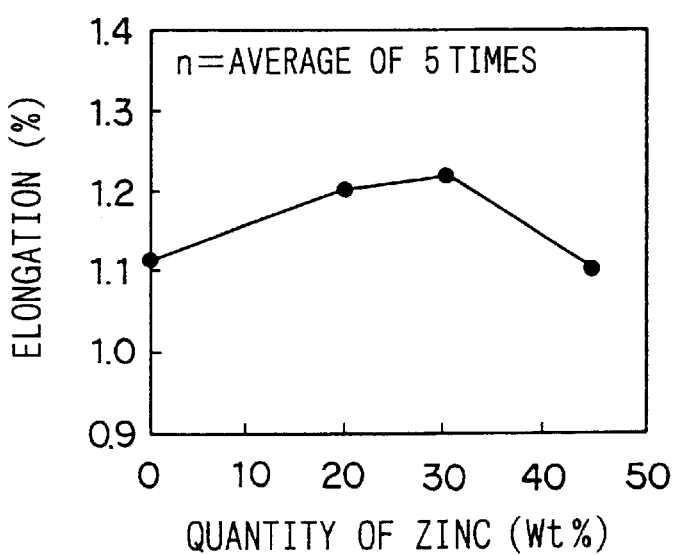
FIG. 6 is a graph showing a relationship between a quantity of zinc and elongation.

Test pieces (TPs) of 4×4×10 mm containing the carbon layer and the metal carbon layer were cut out from the commutator material obtained by the above-described steps. Then, a tensile strength and elongation of the test pieces were measured while varying a quantity of Zn, the results of which are set forth in FIGS. 5 and 6, respectively. As to the tensile strength, a distribution range from −3σ to 3σ with σ being the standard deviation is shown in FIG. 5. FIG. 5 shows a breaking load when the tensile strength test was carried out in a pressing direction by a tensile strength tester.

FIG. 5 shows that it is effective to add Zn up to 45 wt % in order to enhance the strength. Also, it is understood from FIG. 6, which shows the measuring result of elongation when a similar tensile strength test was carried out in a direction perpendicular to the applied pressure, that it is effective to add Zn up to 40 wt % in order to enhance the elongation.

(3) Influence of quantity of metal in metal carbon layer

Test pieces (TPs) of 4×4×10 mm containing the carbon layer and the metal carbon layer were cut out from the commutator material obtained by the above-described steps. Then, a tensile strength at the boundary, a specific resistance value of the metal carbon layer, and a tensile strength of the metal carbon layer of the test pieces were measured while varying a quantity of metal in the metal carbon layer. The results are set forth in FIGS. 7, 8, and 9, respectively. Herein, the measurement was carried out ten times for each quantity of metal and averages are plotted on each graph. Also, a distribution range from −3σ to 3σ with σ being the standard deviation is also shown in each graph.

Figure 8:
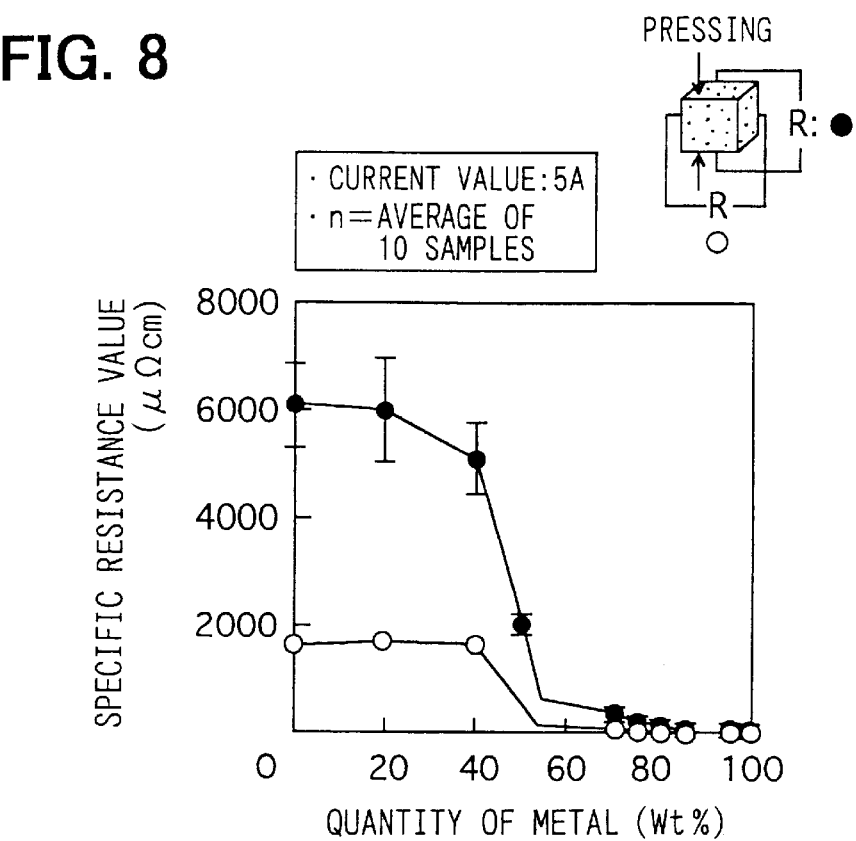
FIG. 8 is a graph showing a relationship between a quantity of metal and a specific resistance value of the metal carbon layer.
Figure 9:
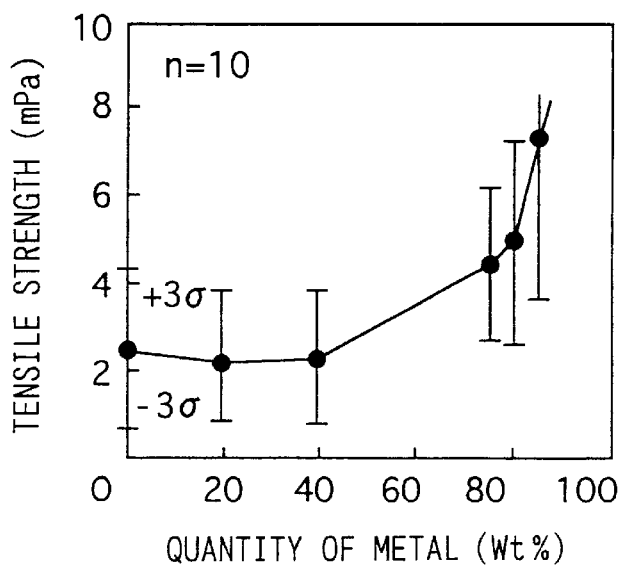
FIG. 9 is a graph showing a relationship between a quantity of metal and a tensile strength of the metal carbon layer.

In addition, the tensile strength indicates a breaking load (stress) in the test carried out by the tensile strength tester. The specific resistance values were measured in two directions of the test pieces. In FIG. 8, a black circle indicates a specific resistance value measured in the pressing direction during the molding step, and a white circle indicates a specific resistance value measured in a direction perpendicular to the pressing direction.

Figure 7:
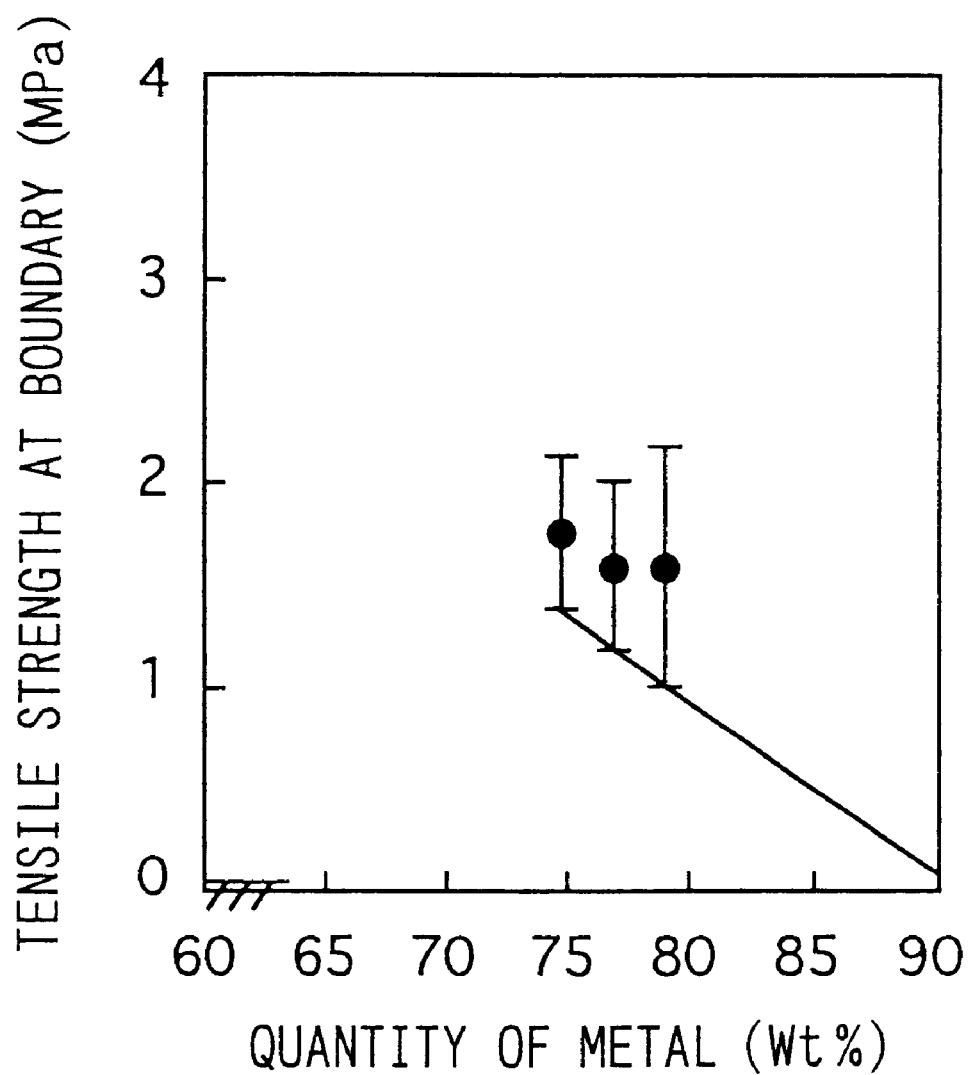
FIG. 7 is a graph showing a relationship between a quantity of metal in a metal carbon layer and a tensile strength at the boundary in the example.

It is understood from FIG. 7 that in order to secure a strength of a certain degree at the boundary of the carbon layer and the metal carbon layer, a quantity of metal has to be 90 wt % or less. On the other hand, it is understood from FIGS. 8 and 9 that in order to secure a strength of a certain degree with the metal carbon layer while lowering the specific resistance value, a quantity of metal has to be 55 wt % or more. In particular, when a quantity of metal is in a range from 70 to 80 wt %, the three factors are well balanced.

(4) Others

Further, the inventor analyzed a difference in formation of a metal skeleton caused by a difference in weight percentage of metal. To be more specific, a plate of metal carbon layer having 40 wt % of brass, and a plate of metal carbon layer having 75 wt % of brass were baked, and shape retentivity after the baking for each was analyzed. Then, when a quantity of brass was 40 wt %, the test piece was not able to retain the plate shape and shattered into pieces. On the other hand, when a quantity of brass was 75 wt %, the test piece was able to retain the plate shape after the baking. The reason why is assumed to be that the brass powder was not sintered satisfactorily when a quantity of brass was 40 wt %, so that the metal skeleton was not formed in the metal carbon layer. On the other hand, it is assumed that, when the quantity of brass was 75 wt %, the brass powder was sintered satisfactorily, and the metal skeleton was formed.

The current-carrying member for the DC motor in the fuel pump attains superior resistance to sulfidation, which makes it possible to enhance the durability of the current-carrying member. Also, the current-carrying member can be obtained easily by the producing method according to the present invention. In addition, a fuel pump employing the current-carrying member of the present invention exhibits superior durability.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A current-carrying member for a direct-current motor in a fuel pump, comprising:

a brush having a sliding surface at one end and fed with a current from a power supply source; and a commutator, having a sliding surface that slides on the sliding surface of said brush, for feeding an armature coil with the current received from said brush, wherein at least one of said brush and said commutator is composed of a carbon layer having carbon as a principal component and forming the sliding surface at a first end, and a metal carbon layer fixedly bound with said carbon layer at a second end and comprising 55 to 90 wt % of metal having brass as a principal component and a remaining portion having carbon as a principal component.

2. The current-carrying member for a direct-current motor in a fuel pump according to claim 1, wherein said metal carbon layer comprises a porous metal skeleton having said brass as a principal component, and a filling material present in said porous metal skeleton and having said carbon as a principal component.

3. The current-carrying member for a direct-current motor in a fuel pump according to claim 1, wherein said brass is a copper alloy containing 25 to 45 wt % of zinc (Zn) on a basis of 100 wt % of said brass.

4. The current-carrying member for a direct-current motor in a fuel pump according to claim 2, wherein said brass is a copper alloy containing 25 to 45 wt % of zinc (Zn) on a basis of 100 wt % of said brass.

5. A fuel pump employing a current-carrying member for a direct-current motor, said current-carrying member comprising:

a brush having a sliding surface at one end and fed with a current from a power supply source; and a commutator having a sliding surface that slides on the sliding surface of said brush for feeding an armature coil with the current received from said brush, wherein at least one of said brush and said commutator is composed of a carbon layer having carbon as a principal component and forming the sliding surface at a first end, and a metal carbon layer fixedly bound with said carbon layer at a second end and comprising 55 to 90 wt % of metal having brass as a principal component and a remaining portion having carbon as a principal component.

* * * * *